Figure 1:
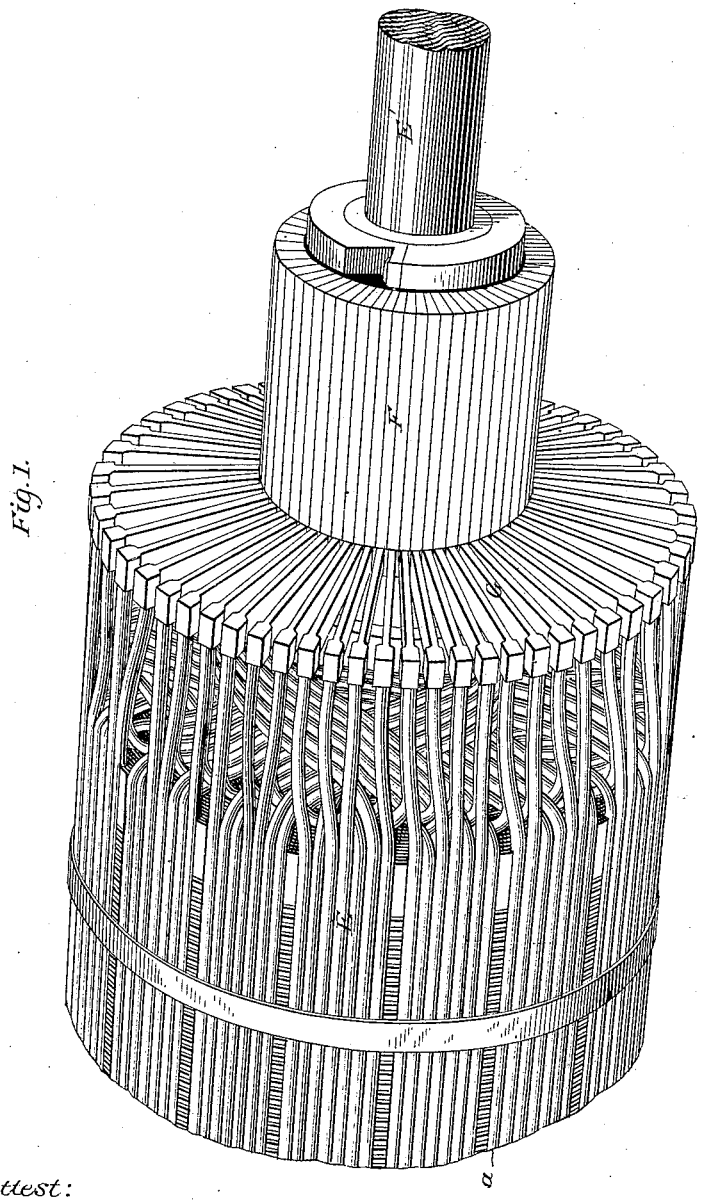

(No Model.)  4 Sheets—Sheet 1.

E. WESTON.
DYNAMO ELECTRIC MACHINE.

No. 278,641. Patented May 29, 1883.

Attest:
Raymond F. Barnes.
W. Frisby

Inventor:
Edward Weston
By Parker W. Page
Atty.

N. PETERS, Photo-Lithographer, Washington, D. C.

(No Model.)  4 Sheets—Sheet 2.
E. WESTON.
DYNAMO ELECTRIC MACHINE.
No. 278,641. Patented May 29, 1883.
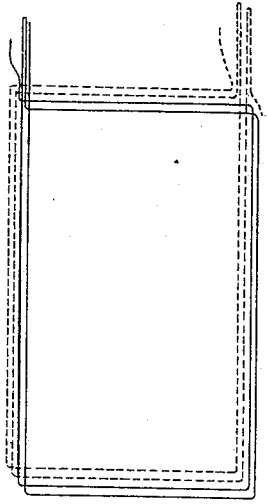
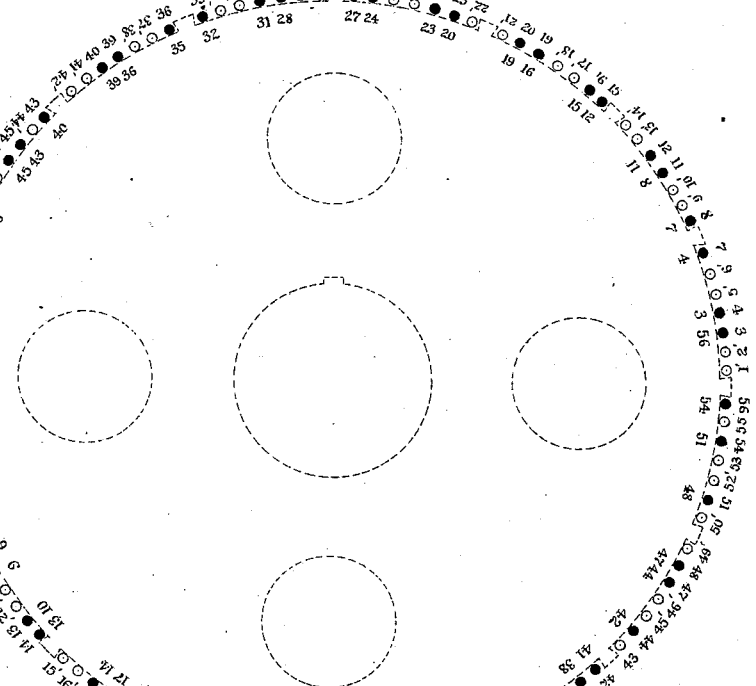
Attest:
Raymond F. Barnes.
N. F. Frisby.
Inventor:
Edward Weston
By Parker W. Page
Atty.

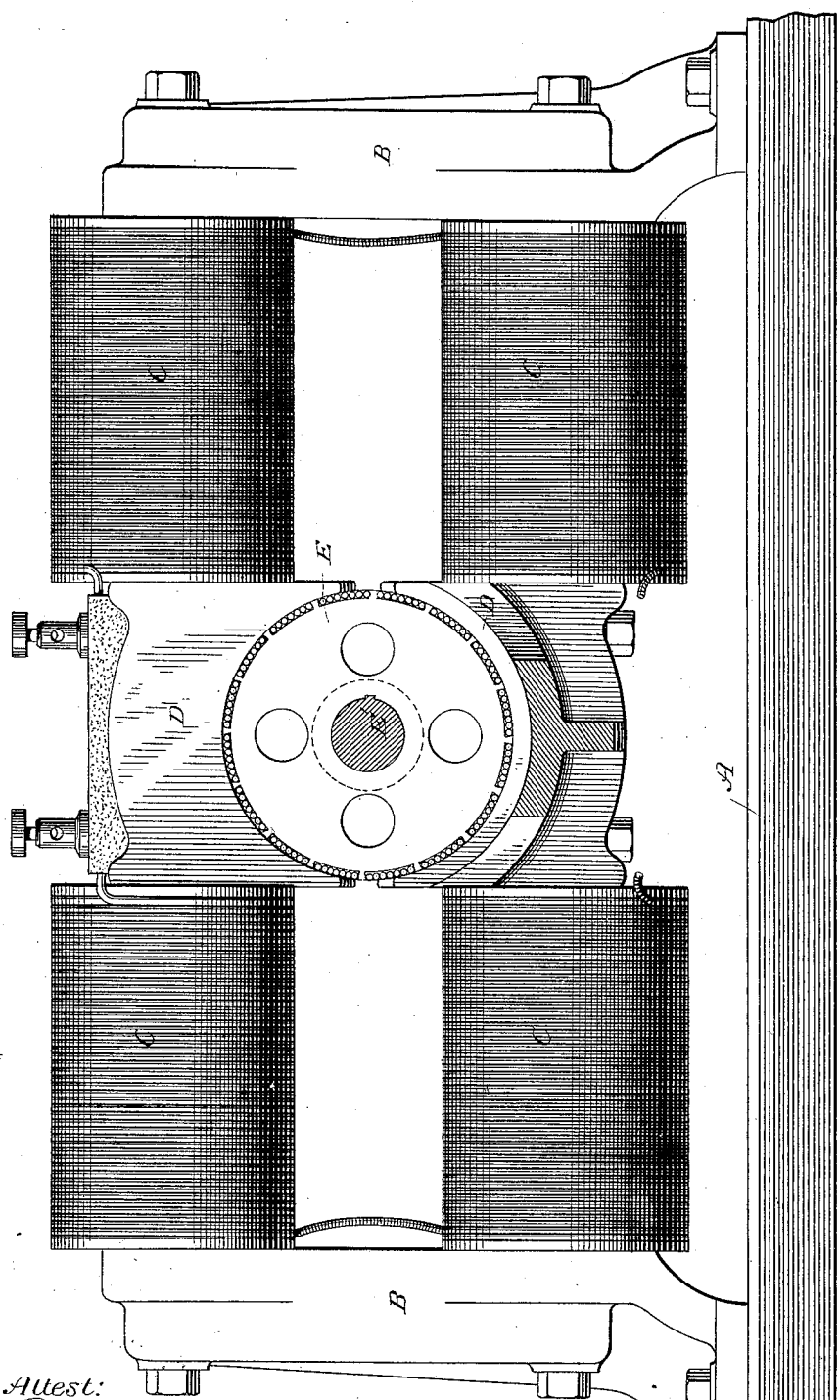

(No Model.) 4 Sheets—Sheet 4.
E. WESTON.
DYNAMO ELECTRIC MACHINE.
No. 278,641. Patented May 29, 1883.
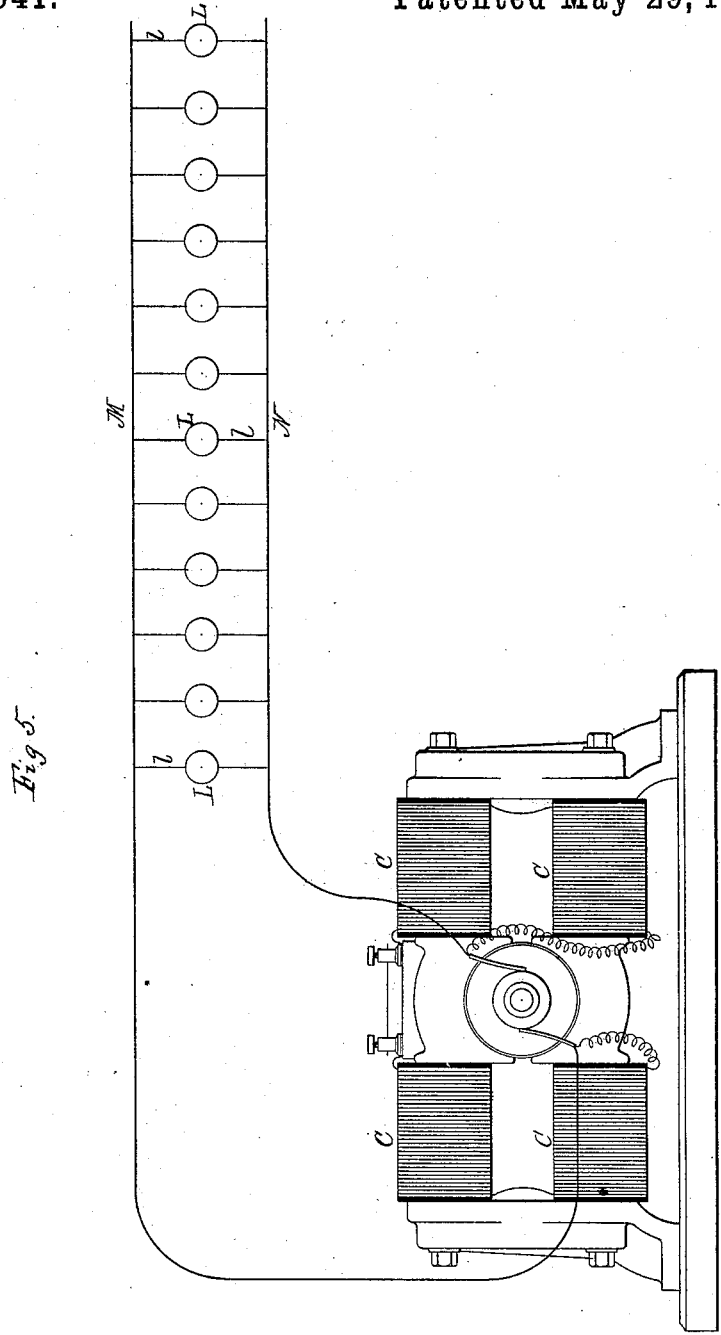

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO-ELECTRIC MACHINE.

SPECIFICATION forming part of Letters Patent No. 278,641, dated May 29, 1883.

Application filed February 20, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Dynamo-Electric Machines, of which the following is a specification, reference being had to the drawings accompanying and forming a part of the same.

My invention relates to what is known as the "multiple-arc system" of generating and distributing electricity—a system in which the devices that utilize the current are included in branches between the main conductors proceeding from one or more generators by which the current is produced. In this system, as is well known, the resistance of the external or working circuit varies inversely as the number of the lamps or other devices in circuit, being inversely proportional to the number of the lamps or other devices when these are all of the same resistance. It is obvious that if in a circuit or system of this kind the electro-motive force produced by the generators were maintained constant and invariable the system would be entirely self-regulating—that is, merely placing lamps or other devices in the circuit or cutting them out from it would react upon the operation of the machine in such a way as to make the generation of current exactly proportional at all times to the demand for current in the lamps or other devices in circuit.

It is understood that the electro-motive force generated by a given machine is determined principally, if not solely, by the strength of the magnetic field within which the armature revolves and the speed of rotation of the armature, and attempts have been made to provide the multiple-arc system of distribution with generators of constant electro-motive force by using field-magnets of constant strength and running the armature at a uniform speed. It has been found, however, in practice, that the electro-motive force developed is not uniform when these conditions alone are observed, but, on the contrary, varies greatly with the number of lamps or other devices in circuit, so that with a machine adjusted for running a few lamps, if any considerable additional number be put in circuit, the electro-motive force falls so much as to materially reduce the current passing through each branch circuit, while on the other hand, if the machine be adjusted for running a large number of lamps, and any considerable number be cut out, the electro-motive force rises so much as to destroy or endanger the remaining lamps. Attempts have been made to overcome this difficulty by the employment of special devices for controlling the strength of the field or varying the speed of the armature; but such devices have, of necessity, been more or less complicated, liable to get out of order, and uncertain in their operation. It is also obvious that from the nature of the case such devices cannot act as perfect regulators, as they depend for their operation upon the reaction upon them of the disturbances of the current which they are designed to rectify.

My improvements consist in so organizing the machine used for supplying current in the multiple-arc system of distribution that by a law of operation of the machine the electro-motive force is maintained practically uniform, whatever may be the quantity of current generated within the practical working limits of the machine. To accomplish this result I have found it necessary to so construct the machine that the inductive influence of the field-magnets in determining the polarity of the armature-core shall so far preponderate over that of the induced currents circulating in and around the armature itself that the effect of the latter is neutralized, at least to such an extent that the polar line of the armature and that of the field shall at all times during the normal operation of the machine practically coincide to reduce the internal resistance of the armature-coils to the lowest possible point, and to eliminate as far as possible all local action. For securing this relation between the field and the armature in the most economical and efficient manner I use massive and powerfully-excited field-magnets, with curved pole-pieces of opposite magnetic polarity, between which I mount a cylindrical armature, the core of which is of such diameter as to nearly fill the space between the poles, and is constructed in such manner as to practically complete the magnetic circuit between the two pole-pieces and form a true keeper for the field-magnets. The armature-core is also constructed in sectional form to prevent the circulation of induced currents within it, which would operate to disturb its proper magnetic condition. I also wind the armature in such manner that the requisite electro-motive force is obtained with comparatively few convolutions of conductors of large cross-section. It is important to use the smallest possible number of convolutions of conductor on the armature, in order to reduce to a minimum the magnetizing influence of the armature-coils upon the core, and the resistance of the armature-conductors is made as low as possible, in order that the ratio of the external and internal resistances may not be greatly disturbed by variations in the external circuit. The purpose of this will be understood by a consideration of the magnetic condition of the armature-core of a machine having an ordinary cylindrical or annular armature, with the coils wound in a direction parallel to the axis of rotation. In such case the position of the polar line, or the points of maximum magnetic effect of the armature-core during the normal operation of the machine, is determined partly by the induced currents flowing in the armature-coils and circulating in the body of the armature itself, both of which tend to fix the polar line at right angles to that of the field, and partly by the magnetic induction of the field, which tends to cause the polar line of the armature to coincide with its own. As a result of the combined effect of these forces, the polar line of the armature will lie between the two points indicated. This is apparent from the fact that in all machines of this class, so far as my information extends, the maximum points of the commutator, or the line upon which the brushes are placed to take off the maximum amount of current, are in advance of the theoretical maximum points, which are on a line at right angles to the polar line of the field, and they are more or less advanced in proportion to the strength of the current induced in the armature-coils, and the consequent magnetizing influence exerted thereby. Probably the fluctuations in electro-motive force observed in such machines are due largely to this angular displacement of the poles of the armature, acting substantially in the same manner to reduce the lines of force cut by the coils as would the removal of the field-magnets to a greater distance from the armature. I have found that if the conditions which I have indicated above are properly observed in constructing the machine the polar line of the armature may be made to coincide with the polar line of the field, and the real maximum points on the commutator be made to coincide so accurately with the theoretical points that the external resistance may be varied to any extent within the working limits of the machine; or the machine may even be run in either direction without changing the adjustment of the brushes, and the electro-motive force will be practically constant for a given speed of rotation of the armature.

The accompanying drawings illustrate in detail the construction of a very efficient form of machine embodying these conditions.

Figure 1 represents in perspective a portion of the armature, the commutator, and shaft. Fig. 2 illustrates diagrammatically the method of winding employed. Fig. 3 is a diagram of a portion of the coils, showing their relative positions when wound upon the core. Fig. 4 is a view, partly in section, of the machine in which the armature is used. Fig. 5 is a diagram illustrating the application of a machine constructed in accordance with my invention to a system of lighting.

The field-magnets C C are composed of heavy iron bars mounted on a base, A, by iron standards B B, and provided with pole-pieces D D. The coils (four in number) are wound to produce consequent poles of unlike sign in the pole-pieces D. The coils may be included in the circuit of an independent generator, or in a circuit derived from the armature of the machine itself, and should be of such character as to impart a strong and uniform magnetism to the field-magnets. Between these the armature E is mounted in suitable bearings, the pole-pieces being brought together and hollowed out, so that the armature runs between them with the smallest practicable clearance. The core of the armature is divided up into a number of sections by divisions transverse to the path of the induced currents. It is preferably formed of a number of independent iron disks or plates strung on the shaft E', and recessed, as shown, for the reception of the coils. The recesses are of sufficient depth to contain only a single layer of the conductor which is to be used in the machine, and are of such width and number that the projections constitute about one-sixth of the periphery of the cylinder. In these recesses the conductors are laid, and in order that the plan of winding and connection may be understood I will describe the method of winding in the case of a machine containing fifty-six coils and the same number of commutator-segments.

Beginning at any given point, as at $a$, the first convolution is formed by winding the conductor around the cylinder along diametrically-opposite lines, bringing it up to the starting-point, then cutting it off and temporarily securing its ends. This conductor is designated by the black and white circles, numbered 1 1', respectively, the black circle indicating the position of the starting point, the white circle its position on the opposite side of the armature. The next convolution, numbered 2, is formed alongside the first in exactly the same manner. To form the third convolution the core is turned half-way round and the convolution started and ended at a point one hundred and eighty degrees from the space next to coil No. 2. The fourth convolution is wound alongside the third, and in the same manner that the second was wound relatively to the first. The core is then turned back and the fifth convolution wound as was the first. The sixth then follows, after which the core is again turned for the seventh and eighth, and so on until the forty-third convolution is wound and temporarily secured. Then, instead of winding the forty-fourth coil from the same side of the core, it is started and ended from the opposite side. The core is then turned and the forty-fifth and forty-sixth coils started from the side opposite to the starting-point of coil 44. The convolutions are then formed in pairs alternately from opposite sides of the core until the fiftieth coil is completed and the core turned for winding coil 51. After this is laid coils 52 and 53 are wound from the opposite side, when the core is again turned for each of the remaining coils 54, 55, and 56. The recesses being now filled, the several convolutions of conductor are joined together in the ordinary manner—that is, designating the ends of any convolution as the "first" and "last" end, the last end of convolution 1 is joined to the first end of convolution 2, the last of convolution 3 to first of 4, and so on around the armature. The numerals in Fig. 2 are placed to indicate this system, and by following them the order of winding and connection may be clearly seen. The joints or loops, when formed in this way, are united to radial arms G, extending from the plates of a commutator, F. It will be observed that the number of coils, loops, and commutator-plates is the same. In so far as the winding alone is concerned, it is not essential that this method be strictly followed, although for machines designed for producing currents of great quantity—such as are adapted for incandescent lighting or electroplating—this plan of winding is believed to present the greatest advantages. By making use of it a complete circle of loops—one for each convolution of conductor—is obtained, the direction of winding is the same all round the core, the conductors are wound in a single layer, and the number of convolutions in circuit is even, so that there is an exact balance between the two halves of the armature. These results are not obtainable with any other system of winding of which I am aware, for when the convolutions are even in number and wound all singly or all in pairs alternately from opposite sides of the core it is impossible to avoid the occurrence of an odd or inactive coil. The principal advantages, however, of winding the armature with a single layer of conductors and connecting each convolution to a commutator-plate are that all the conductors are placed in the most intense part of the field, and the requisite electro-motive force is obtained with fewer convolutions and lower internal resistance than could otherwise be used, and this, as I have already pointed out, is of great importance in the operation of the machine.

Where coils of more than one layer are used difficulties are also occasioned by the difference in potential between coils that are nearest the field-magnets and those that are farthest from them, which have to be overcome by special methods of winding.

Though described in its application to the winding of an armature having a given number of coils or convolutions, it is obvious that my method of winding is applicable to armatures containing a greater or less number of coils than fifty-six, providing the number be an even one, and I would state that the specified plan of changing from the double to the single alternate winding may be varied in any way that will produce the same results—viz., to obtain such a distribution of coils that there will be an equal number on any two halves of the armature-core.

By using field-magnets and pole-pieces containing a relatively great mass of iron, and by constructing and winding the armature in the manner described, a nearly-closed magnetic circuit between the opposite poles is obtained. For this purpose the cylindrical form of armature has great advantages over the annular form, as it presents a direct and continuous magnetic path between the poles of the field, so that the lines of force are not distorted or displaced, but are all concentrated on the core.

It will be observed, also, that in the armature which I have shown a part of the magnetic material of the core is brought up between the coils almost into direct contact with the faces of the field-magnets. The armature so formed constitutes, in the proper sense of the term, an armature or keeper for the field-magnets, and very little free magnetism is exhibited outside the field, its inductive force being almost wholly exerted upon the armature, so that the influence of the field in fixing or determining the polarity of the armature is the greatest possible, and nearly all the lines of force are concentrated upon the armature-core, so as to be cut by the moving conductors. By dividing up the armature-core into sections, the circulation of induced currents is almost entirely prevented, by which means heating and the disturbing effects upon the normal magnetic poles of the armature are avoided. The presence of these features appears to be essential in a machine capable of developing a constant electro-motive force without changing the excitement of the field, though, from the principle of construction which has now been described, it is evident that the partial or entire absence of some of the conditions may be compensated for, in a measure at least, by the exaggeration of one or all of the others. For instance, if the distance between the poles of the field-magnets and the iron core of the armature be somewhat increased, as when the coils occupy a greater space than in the present instance, or when the polar projections on the core are dispensed with, so that the magnetic circuit from pole to pole is not so complete as it would otherwise be, this may be compensated for in great measure by increasing the power of the field-magnets.

In using the machine, conductors M N are run from the binding-posts of the machine, and incandescent lamps L, or other and similar devices, are connected unto the conductors by cross-circuits $l\,l$. The lamps are of such a character that when the machine is running under normal conditions the candle-power produced by the current will be the standard light required.

I am aware that armatures composed of iron plates insulated from one another and recessed for the reception of coils have been described in patents heretofore granted to me. I am also aware that solid or hollow cylinders, or cylinders composed partly of iron and partly of non-magnetic materials, have been used as armatures; but in no instance of which I am aware have the relations of field and armature herein described existed, and What I therefore claim is—

1. In a system of generating and distributing electricity, the combination, with a dynamo or magneto electric generator operating to produce a constant electro-motive force, and constructed, substantially as described, of main conductors connected with said generator, and devices included in branch circuits from the main conductors for utilizing the current produced by the generator, whereby the system is made entirely self-regulating.

2. In a dynamo-electric machine, the combination, with the field-magnets, of a cylindrical armature and conductors wound thereon and connected to the plates of a commutator, the field-magnets and armature being constructed relatively to each other in substantially the manner herein described, whereby the polar line of the armature is made to coincide with that of the field during the normal operation of the machine, as and for the purpose set forth.

3. A dynamo-electric machine constructed, substantially as described, to maintain the polar line of the armature in a fixed position coincident with the polar line of the field.

4. A dynamo-electric machine constructed, substantially as described, to maintain the maximum points of the commutator in a fixed line at right angles with the polar line of the field.

5. In a dynamo-electric machine, a cylindrical armature-core, in combination with conductors wound thereon with an even number of convolutions in a single layer, each convolution being connected to a separate insulated commutator-plate, as set forth.

6. The method herein described of winding the conductors of a cylindrical armature, which consists in winding side by side a portion of the convolutions in pairs, and a portion singly, beginning alternately from opposite sides of the same end of the cylinder, and connecting the convolutions to form a single circuit, as and for the purpose set forth.

In testimony whereof I have hereunto set my hand this 12th day of February, 1883.

EDWARD WESTON.

Witnesses:
HENRY A. BECKMEYER,
V. INNES.